Patented Feb. 8, 1938

2,107,515

UNITED STATES PATENT OFFICE 2,107,515

PROCESS FOR THE PRODUCTION OF HYDRATED OLEFINES

Franklin A. Bent, Berkeley, Calif., assignor to Shell Development Company, San Francisco, Calif., a corporation of Delaware No Drawing. Application August 28, 1933, Serial No. 687,198

16 Claims. (Cl. 260—156)

This invention relates to a process for hydrating olefines, more particularly to the direct synthesis of alcohols from olefines. The process comprises the direct addition of water to an olefine under conditions of elevated temperature and pressure in the presence of a catalyst. The mechanism of the process may be represented by the general equation

$$C_nH_{2n} + H_2O \rightleftarrows C_nH_{2n+1}OH$$

As designated in the above equation, this reaction is reversible. At each different temperature under a given pressure, there can be an equilibrium between the components, i. e., if an olefine is placed in contact with water and if equilibrium is attained, there will be a mixture of olefine, water and alcohol stable at the existing external conditions. The amount of alcohol that theoretically can be formed from a mixture of olefine and water at each definite condition of temperature and pressure is known as the equilibrium concentration of alcohol at that condition of temperature and pressure. The rate and degree of attainment of the equilibrium concentration is a matter of great practical importance.

It is well known that the rate of reaction of an olefine and water is so exceedingly slow even under conditions of elevated pressure and temperature as to be commercially valueless as a means of producing alcohols.

I have discovered that the presence of certain metallic compounds cause water and an olefine to react, under suitable conditions of pressure and temperature, at such a rate that a large concentration of alcohol is quickly formed and to such a degree as to make my process of commercial value.

I have found that salts of metals, especially those of heavy metals, when used in aqueous solution or suspension catalyze the reaction of an olefine with water. Salts of strong acids, such as the metal sulphates or chlorides, are particularly good catalysts, especially zinc sulphate, when used under proper conditions of temperature and pressure. Also may be mentioned, beryllium sulphate, magnesium sulphate, zinc chloride, magnesium chloride and beryllium chloride as well as their bromides, iodides and fluorides.

I have found that by contacting the olefine with water containing a metal salt, preferably a heavy metal sulphate, at a temperature of from about 200° C. to a temperature of 374° C. and under a pressure of not less than about 100 atmospheres, large concentrations of alcohols are formed at such a rate as to make my process commercially feasible.

I have also found that there is a marked difference in the extent to which different olefines are hydrated to form the corresponding alcohol. Each olefine requires slightly different conditions of temperature and pressure as well as concentration of catalyst.

The invention will now be described and illustrated by reference to a continuous process, it being understood, however, that it also may be practiced as a batch or intermittent process. The olefine is forced into a heated pressure-proof vessel containing a solution or suspension of a metal salt in water, maintained at a temperature of not less than 200° C. or more than 374° C. and at a total pressure of not less than about 1500 lbs. but preferably at a pressure of 3000 lbs. or over. The olefine is bubbled or contacted in any efficient manner with the liquid contained in the pressure vessel and a reaction takes place to form the alcohol corresponding to the olefine. The alcohol formed, together with unused olefine and water vapor, is withdrawn from the top or bottom of the pressure vessel in either vapor phase or liquid phase and is separated from the other ingredients by the usual devices for condensation or rectification. The unreacted olefine is recycled to the pressure vessel and the process is repeated. The water vapor may be returned to the pressure vessel; its heat content may be utilized elsewhere; or it may be wasted. During the operation of the process, water is introduced into the pressure vessel concurrently with the olefine in an amount sufficient to replace that removed by vaporization and by the reaction with the olefine and to maintain the concentration of metallic salt within the preferred limits.

While not limiting myself to the use of these conditions, the following are most favorable to the hydration of olefines by water: an olefine is most efficiently hydrated by contact with an aqueous zinc sulphate solution, containing 8–25% $ZnSO_4.7H_2O$ at 25° C.; at temperatures from about 275° C. to about 325° C. and at total pressures from about 2500 to 3500 lbs.

The following examples are submitted only by way of illustration and my invention is not to be regarded as restricted thereto, as my invention is susceptible of execution with a large number of catalysts under varying conditions of temperature and pressure:

I

Propylene gas is conducted into a pressure vessel containing an aqueous zinc sulphate solution, containing 8% ZnSO₄.7H₂O at 25° C., at a temperature of 286° C. and under a total pressure of 3000 lbs. The proylene is rapidly and readily hydrated to isopropyl alcohol in a yield equal to 66% equilibrium concentration of isopropyl alcohol possible at these conditions of temperature and pressure. The isopropyl alcohol, water and unused proplene are continuously withdrawn from the top of the pressure vessel and are separated by condensation and rectification. The propylene thus recovered is returned to the pressure vessel.

II

Ethylene is contacted with an aqueous zinc sulphate solution, containing 25% ZnSO₄.7H₂O at 25° C., maintained at a temperature of 300° C. and under a pressure of 3000 lbs. About 20% of the ethylene is converted into ethyl alcohol and is removed and separated as described in Example I. The recovered ethylene is returned to the pressure vessel and recirculated.

III

A mixture of alpha- and beta-butylene is contacted with an aqueous zinc sulphate solution, containing 8% ZnSO₄.7H₂O at 25° C., maintained at a temperature of 286° C. and under a pressure of 3000 lbs., a yield of secondary butyl alcohol equal to 40% of the equilibrium concentration of secondary butyl alcohol possible under these conditions is obtained. The alcohol is separated and the unused butylene is returned to the process as described in Example I.

IV

Propylene (97.0% pure) is contacted with two liters of an aqueous magnesium sulphate solution, containing about 8% MgSO₄ at 25° C., at 286° C. and under a pressure of 3000 lbs. total pressure. The rate of effluent hydrocarbon liters/min. is 1.43. In one pass alone, 16.6% of the propylene is converted to isopropyl alcohol.

V

With the same conditions as in Example IV, except that tertiary butylene (96.0% pure) is employed, 8.9% of the olefine is converted to tertiary butyl alcohol in one pass of the hydrocarbon through the catalyst.

VI

With the same conditions as in Example IV, except that beta butylene (92.2% pure) is employed, about 5% of the olefine is converted to secondary butanol in one pass of the hydrocarbon through the catalyst.

While the above examples refer only to single olefines, it is understood that this invention is equally applicable to mixtures of olefines, to olefines containing inert components, and to gases and liquids containing olefines.

One or more catalysts may be employed to effect hydration of a particular olefine or olefinic mixture.

The term "dependent" where used in the claims will signify the state of solution or suspension with reference to the metallic salt contained in the aqueous medium.

While I have in the foregoing described in some detail the preferred embodiment of my invention and some variants thereof, it will be understood that this is only for the purpose of making the invention more clear and that the invention is not to be regarded as limited to the details of operation described, nor is it dependent upon the soundness or accuracy of the theories which I have advanced as to the reasons for the advantageous results attained. On the other hand, the invention is to be regarded as limited only by the terms of the accompanying claims, in which it is my intention to claim all novelty inherent therein as broadly as is possible in view of the prior art.

This application is a continuation-in-part of my application, Serial No. 508,809 filed January 14, 1931.

I claim as my invention:

1. A process for the production of a hydration product of an olefine comprising directly hydrating the olefine under superatmospheric pressure and at a temperature materially above room temperature but below about 374° C. in the presence of water and a salt of the class consisting of the sulfates of beryllium, magnesium and zinc.

2. A process for the production of a hydration product of an olefine comprising directly hydrating the olefine under superatmospheric pressure and at a temperature materially above room temperature but below about 374° C. in the presence of water and beryllium sulfate.

3. A process for the production of a hydration product of an olefine comprising directly hydrating the olefine under superatmospheric pressure and at a temperature materially above room temperature but below about 374° C. in the presence of water and magnesium sulfate.

4. A process for the production of a hydration product of an olefine comprising directly hydrating the olefine under superatmospheric pressure and at a temperature materially above room temperature but below about 374° C. in the presence of water and zinc sulfate.

5. A process for the production of a hydration product of an olefine comprising directly hydrating the olefine at a pressure not substantially less than 100 atmospheres and at a temperature materially above room temperature but below 374° C. in the presence of water and a salt of the class consisting of the sulfates of beryllium, magnesium and zinc.

6. A process for the production of a hydration product of an olefine comprising directly hydrating the olefine at a temperature from about 200° C. to about 374° C. in the presence of water and a salt of the class consisting of the sulfates of beryllium, magnesium, and zinc at a pressure not substantially less than 100 atmospheres.

7. A process for the production of a hydration product of an olefine which comprises directly hydrating the olefine at a pressure not substantially less than 100 atmospheres at a temperature materially above room temperature but below about 374° C. in the presence of water and zinc sulfate.

8. A process for the production of a hydration product of an olefine which comprises directly hydrating the olefine at a temperature from about 200° C. to about 374° C. in the presence of water and zinc sulfate at a pressure not substantially less than 100 atmospheres.

9. A process for the production of a hydration product of an olefine which comprises directly hydrating the olefine at a temperature from about 275° C. to about 325° C. in the presence of water containing zinc sulfate while under a pressure of not substantially less than 200 atmospheres.

10. A process for the production of a hydration product of an olefine which comprises directly hydrating the olefine at a temperature from about 275° C. to about 325° C. in the presence of an aqueous zinc sulfate solution at a pressure substantially greater than atmospheric.

11. A process for the production of a hydration product of an olefine which comprises directly hydrating the olefine at a temperature from about 275° C. to about 325° C. in the presence of an aqueous zinc sulfate solution, containing 8 to 25% $ZnSO_4.7H_2O$ at 25° C., at a pressure substantially greater than atmospheric.

12. A continuous process for the production of a hydration product of an olefine which comprises continuously hydrating an olefine under superatmospheric pressure and at a temperature materially above room temperature but below about 374° C. in the presence of water and a salt of the class consisting of the sulfates of beryllium, magnesium and zinc, withdrawing the hydration product together with unreacted olefine and water from the pressure vessel and recovering and recycling the unreacted olefine.

13. A continuous process for the production of a hydration product of an olefine which comprises continuously hydrating an olefine under superatmospheric pressure and at a temperature materially above room temperature but below about 374° C. in the presence of water and a salt of the class consisting of the sulfates of beryllium, magnesium and zinc, withdrawing the hydration product together with unreacted olefine and water vapor from the pressure vessel, recovering and recycling the unreacted olefine and continuously introducing water into the pressure vessel at a rate sufficient to replace that removed by vaporization and by reaction.

14. A continuous process for the production of a hydration product of an olefine comprising continuously hydrating an olefine under superatmospheric pressure and at a temperature materially above room temperature but below about 374° C. in the presence of water and zinc sulfate, withdrawing the hydration product together with unreacted olefine and water from the pressure vessel and recovering and recycling the unreacted olefine.

15. A process for the production of a hydration product of an olefine comprising directly hydrating the olefine under superatmospheric pressure and at an elevated temperature sufficient to effect hydration of the olefine in the presence of water and a salt of a metal possessing an atomic number not greater than 30 in Group II of the Periodic Table, said salt being of an acid character in water.

16. A process for the production of a hydration product of an olefine comprising directly hydrating the olefine under superatmospheric pressure and at an elevated temperature sufficient to effect hydration of the olefine in the presence of water and a sulfate of a metal possessing an atomic number not greater than 30 in Group II of the Periodic Table.

FRANKLIN A. BENT.